April 1, 1952 — H. M. OLSON — 2,591,190
PISTON RING
Filed Oct. 31, 1949 — 2 SHEETS—SHEET 1
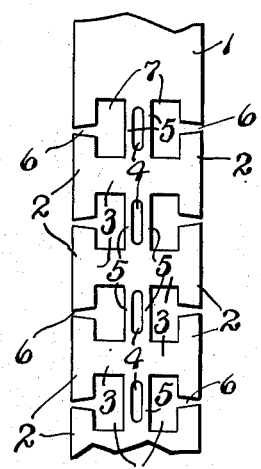
Fig. 1.
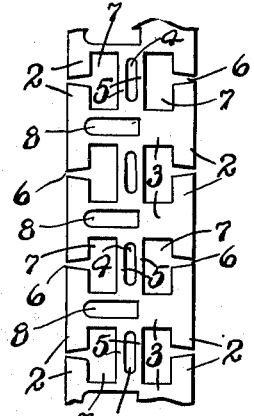
Fig. 2.
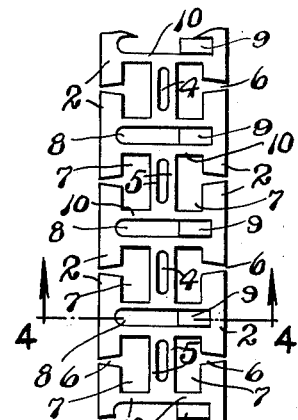
Fig. 3.
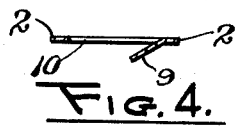
Fig. 4.
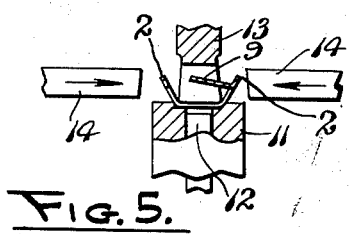
Fig. 5.
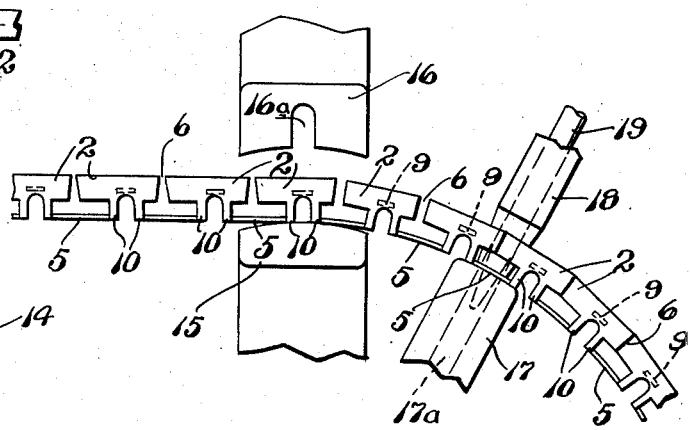
Fig. 8
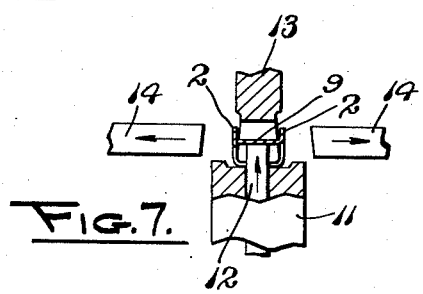
Fig. 6.
Fig. 7.
INVENTOR
HOLLY M. OLSON
BY Luerance and Van Antwerp
ATTORNEYS April 1, 1952  H. M. OLSON  2,591,190
PISTON RING
Filed Oct. 31, 1949  2 SHEETS—SHEET 2
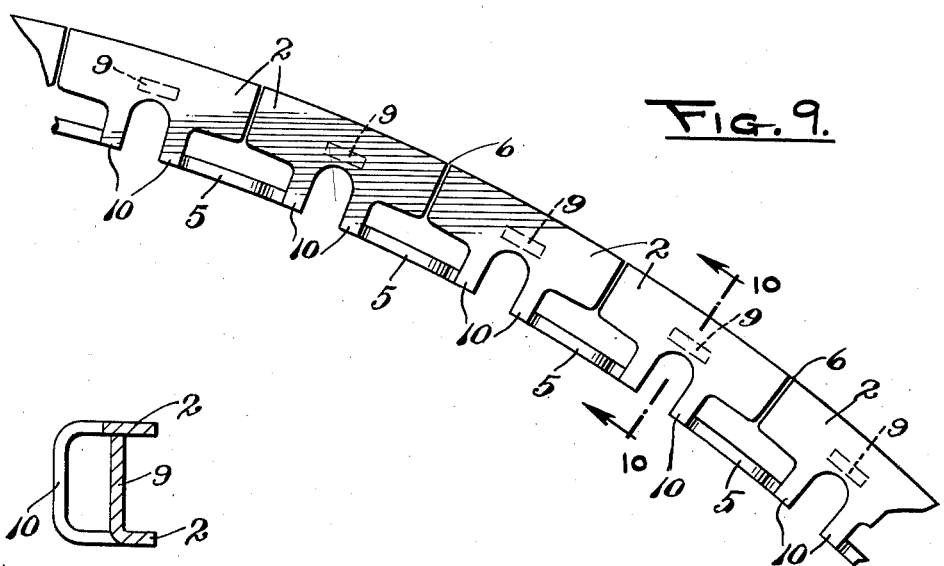
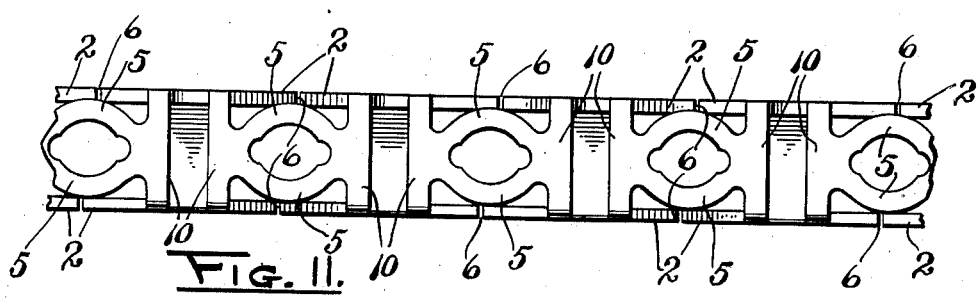
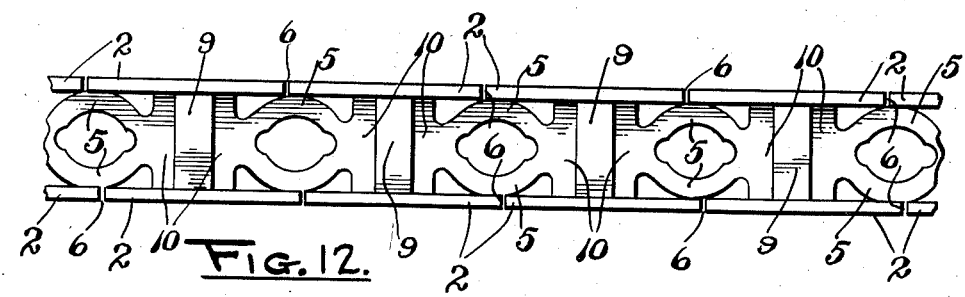
INVENTOR
HOLLY M. OLSON
BY
ATTORNEYS Patented Apr. 1, 1952

2,591,190

UNITED STATES PATENT OFFICE 2,591,190

PISTON RING

Holly M. Olson, Muskegon, Mich., assignor to Sealed Power Corporation, Muskegon, Mich., a corporation of Michigan Application October 31, 1949, Serial No. 124,643

7 Claims. (Cl. 309—45)

1

The present invention relates to a novel, circumferentially contractible oil conserving piston ring. Piston rings of such character are usually made of thin steel, having spaced apart cylinder bearing lands which are divided and spaced at their ends from each other short distances measured in a small number of thousandths of an inch, the circumference of a ring including a large number of successive land segments. Such piston ring, when placed in the ring groove of a piston, with the piston installed in an engine, is contracted circumferentially, substantially closing the gaps or partings between adjacent ends of the several land segments whereby substantially the entire surface of a cylinder wall is engaged by the upper and lower lands of the ring said lands being spaced from each other axially. The action of the ring is to scrape and remove excess oil from the cylinder wall, deliver it to the groove between the upper and lower bearing lands of the ring, the back of the ring having full ventilation in the way of openings for the passing of the oil to the bottom of the ring groove from which it is conducted through passages leading from the ring groove to the interior of the piston, the oil eventually returning to the crankcase of the engine. Such oil conserving rings are located in the lowermost grooves of pistons and at times in the lowermost and next lowermost grooves thereof. They perform little or no sealing action against the downward passage of the compressed charges of gaseous fuel or exhaust gases, this being taken care of by the upper rings on the pistons, but their major and substantially sole function is to conserve oil and prevent its upward passage to the combustion chambers of the engine. If oil reaches such combustion chambers it is burned and may result in fouling the engine and the spark plugs thereof and is frequently indicated by excess smoke in the exhaust from the engine.

It is an object and purpose of the present invention to provide a piston ring which is readily manufactured from thin ribbon steel stock, the process of manufacture being a continuous one in progressive steps, and the ring which is produced, in addition to being economical to manufacture, is of a novel character in which the contraction of the ring within a cylinder and its normal expansion when free is obtained in a new and better way by means of novel structure, not heretofore used, the tension set up in the ring by such contraction resulting in a tendency for it to expand which causes it to bear, with a proper unit pressure, against the cylinder walls so as to render it effective in removing excess oil from the walls.

An understanding of the invention and the preferred form of structure embodying it may be had from the following description, taken in connection with the accompanying drawings, in which Fig. 1 is a fragmentary plan view showing the initial or first steps of punching or piercing a strip of thin ribbon steel in making the ring, Fig. 2 is a similar plan showing the second progressive step of the operations followed, Fig. 3 is a like view of the final punching step performed upon the ribbon stock, Fig. 4 is a transverse section substantially on the plane of line 4—4 of Fig. 3, Fig. 5 is a fragmentary transverse section through the first forming operation, Fig. 6 is a like view showing the second step thereof which is a continuance of movement of the forming process shown in Fig. 5, Fig. 7 illustrates the final or completing step of the forming of the strip shown in Fig. 3, in the formation and spacing of the lands of the rings from each other and the positioning of the reinforcing strut supporting means between each upper and lower pair of segments of the bearing lands, Fig. 8 is an elevation illustrating the shaping of a continuous length of the formed structure, produced at Fig. 7, into circular or ring form and the succeeding and final step of formation which closes the gaps between adjacent ends of the land segments, Fig. 9 is a fragmentary enlarged plan view of the finished ring in accordance with my invention, Fig. 10 is a transverse section therethrough on the plane of line 10—10 of Fig. 9, Fig. 11 is a fragmentary inner or rear elevation of the completed ring, and Fig. 12 is a similar front elevation thereof, the views in Figs. 9 to 12 inclusive being enlarged.

Like reference characters refer to like parts in the different figures of the drawings.

An understanding of the ring structure may be obtained by following its process of manufacture from a flat thin ribbon 1 of the material used, preferably a suitable relatively high carbon steel. Such ribbon of steel in any desired length is moved progressively in the direction of its length in periodic steps from one series of dies to another. The first dies form the steel substantially as shown in Fig. 1, with the segments 2 of the ring lands connected by inwardly extending sections 3 with a central longitudinally disposed zone of the strip, the two sections 3 extending inwardly from the opposite land segments 2, being integrally connected so that the two segments extend entirely across from the inner edges of said opposed segments. At their side edges longitudinally disposed sections extend, connecting to the next sections 3 each of which is longitudinally slotted, as indicated at 4, leaving at each side of each slot 4 a narrow strip 5 as shown. The segments 2 at adjacent ends are separated from each other by slots 6 which at their inner ends are in conjunction with rectangular openings 7 which are cut from the interior area of the ribbon 1, of the proper lengths and widths so as to define connections 3 and the sections at right angles thereto in which the slots 4 are made.

In the succeeding progressive step of piercing the ribbon stock transverse slots 8 are cut as shown in Fig. 2. The slots 8 are closed at both their outer and inner ends. At their outer ends they reach substantially to each of the land segments 2 at one side of the ribbon stock, and extend the full length of the sections 3 in which located substantially to the inner ends of the opposite sections 3. The final step of punching and piercing the strip is to strike a tongue 9 from the inner end of each of the slots 8, in alignment therewith, in said opposite sections 3. Such tongues are severed at each side from the sections 3 in which located but remain connected integrally at their outer ends to the land segments 2 opposite those to which the slots 8 extend. In the forming, the tongues 9 are pressed downwardly at an angle to the plane of the ribbon stock as shown in Fig. 4. The slots 8 are extended in length by the tongues 9 being formed and laterally bent so as to reach from one land segment to its opposite land segment, leaving at each side of each lengthened slot 8 a narrow strip 10 which, being integrally connected with the strips 5, there is provided a successive connection of the several pairs of land segments 2 by the strips 5 integral at their ends with adjacent strips 10.

In the continuation of movement of the ribbon of metal, after the punching operations have been performed to the extent shown in Figs. 3 and 4, the metal passes to forming dies. In such passage it is turned over, which can be readily done by a twist or half turn between the stations which complete the piercing and punching in Figs. 3 and 4 to that shown in Fig. 5. The strip passes to and over a die 11 which is stationary, and through which is an upwardly moving die 12 midway between its sides; and over which is a downwardly moving die 13. The formation of the upper side of the die 11 is such that when the die 13 comes down against the strip, as it is stopped periodically, the two opposite land segments 2 will extend upwardly and outwardly at an angle to the horizontal as shown in Fig. 5, with the tongue 9 extending from the land segment 2 with which is integrally connected in the general direction toward the opposite land segment 2, the narrow connecting strips 10 between the segments being bent at two spaced apart points as shown. The die 13 at its lower end is divided so that the strut 9 has space in which to move.

There are two horizontally disposed forming dies 14 one outwardly of each side of the upwardly extending segments 2 which, after the forming has reached the stage shown in Fig. 5, move simultaneously inward toward each other and force the land segments 2 toward each other from their angular position shown in Fig. 6 so that the sides provided by the two spaced lands 2 and the parts of the connecting strips 10 between them converge toward each other in an upward direction, the outer sides of the die 13 being angularly disposed for such purpose. The dies 14 are then moved outwardly away from each other and the lower die 12 moved upwardly, as in Fig. 7, positioning the strut 9 at right angles to the land segments 2 and between them thereby bringing such segments in parallel relation to each other.

The final steps in the process of manufacture form the connected generally U-shaped sections of the ring connected by the parts 5 into circular form, and to close the slots at 6 to bring adjacent ends of the land segments 2 closely together. The circular formation is done by the opposite dies 15 and 16 between which each of the U-shaped sections is brought and stopped. The die 16 comes down on the lower die 15, the complementary faces thereof being, respectively, convex and concave, so that with a continuation and repeating of the operation the ring takes its circular form. The slot at 16a in die 16 is for passing by the struts 9.

Immediately beyond the dies 15 and 16, is a die anvil 17 having a longitudinal opening 17a through it, cooperating with which is a holding die 18 through which a substantially rod like punch 19 passes having a generally conical terminating end. The anvil 17 is located at an angle to the forming die 15 and the die 18 and punch 19 are in alignment therewith. When the connecting narrow strips 5, each pair with the slot 4 between them, reach the anvil 17 their movement thereon is stopped, the holding punch 18 is moved to position to clamp the strips 5 between it and the anvil 17, and the punch 19 is then moved for its pointed end to enter the passage 17a, thereby spreading the strips 5 away from each other and widening the slot 4 to the form which is shown best in Figs. 11 and 12. This widening shortens the distance between the successive land segments 2 so that the slots 6 are narrowed sufficiently to bring the ends of adjacent land segments 2 in close proximity to each other with a very narrow distance not exceeding 3 or 4 thousandths of an inch between them.

The ring when completed, as shown in Figs. 9, 10, 11 and 12, has in each section thereof two spaced horizontal lands 2 integral with which, at their rear edges, are the generally U-shaped connectors 10 in pairs which are spaced from each other in the circumference of the ring a distance equal to the width of the strut 9, which is integrally connected at one end to one of said lands 2 and extends to and bears at its free end at the inner side of the opposite land segment 2. The several sections of the ring each made up of an upper and lower segment 2 and the connectors 10 between them are joined together by the connecting strips 5 which have been deformed outwardly away from each other for the purpose of closing the gaps or partings at 6 between adjacent ends of the segments 2.

Such a piston ring is circumferentially compressible. The parts 5 are relatively rigid and do not yield upon ring compression, but the connectors 10 are yieldable toward each other midway between their ends and while resisting yielding, yield sufficiently that the ring which in exterior diameter is normally greater than the inner diameter of a cylinder in which it is to be used, may be contracted to enter the cylinder. The resistance of the parts 10 between the land segments of the ring tends to expand the ring and, therefore, causes a pressure of the edges of the land segments 2 against the cylinder wall. The struts 9 substantially midway between the ends of upper and lower land segments 2 hold said segments from any fluttering or vibration in operation or movement toward each other. As they are held at their outer sides against opposite sides of the ring groove, the ring is maintained against undesired vibrating or fluttering movements.

It will be noted that the partings or gaps 6 between the segments 2 of the upper land are a short distance out of vertical alignment with the like partings 6 between the segments of the lower land segments 2. This is preferred as any surface of the cylinder, which might be left untouched by the upper land segments 2 at the partings at one side of the ring will be engaged by the segments 2 at the other side of it. Of course, such partings could be in direct alignment without changing the invention.

The ring structure is one which is readily manufactured and in which a circumferential contraction of the ring is attained, with a development of the necessary unit pressure of the outer edges of the land segments 2 against the cylinder wall. Of course, preferably, the outer or scraping edges of the lands, before the ring is used, will be ground to conform to the surface of the cylinder in which used, the edges of the land segments 2 not being left straight as shown in Fig. 8.

The novel structure described is practical and useful and economical to produce. The invention is defined in the appended claims and is to be considered comprehensive of all forms of structure coming within their scope.

I claim:

1. A piston ring of thin sheet metal comprising, a consecutive series of circumferentially spaced land segments, adapted to be located in a cylinder in two spaced horizontal planes with land segments disposed one over the other in pairs, each of said pairs of land segments being independently connected by generally vertically disposed narrow circumferentially spaced connecting strips, and substantially rigid horizontal connecting means extending between the adjacent connecting strips of successive pairs of land segments, said connecting strips yieldingly resisting movement toward each other on compressive contraction of the ring to smaller diameter.

2. A structure as defined in claim 1, and a strut disposed between each pair of spaced land segments between the inner and outer curved sides of the ring, and between the connecting strips of said lands.

3. A piston ring of thin sheet metal comprising, two spaced cylinder bearing lands, each comprising a plurality of land segments located circumferentially around the ring having adjacent ends in close proximity to each other, each of said land segments at its inner edge having generally U-shaped integral connectors extending between it and the segment opposed to it in the other land, said connectors being spaced from each other and independent of other lands, and adjacent connectors connected with successive adjacent land segments having relatively rigid integral tie means between them at the inner side of the ring, whereby the two connectors which independently connect each pair of land segments are flexed toward each other and yield upon circumferential contraction of the ring to a smaller diameter, and restore the ring to its initial diameter upon release of contracting pressure thereon.

4. A piston ring as defined in claim 3, and a strut integrally connected at one end to one of each pair of associated oppositely disposed land segments, said strut extending to and bearing against the opposite land segment directly outward of the space between the independent connectors of the pairs of land segments.

5. A structure as defined in claim 3, said ties between said land segment connectors comprising two members spaced from each other the major portion of their length in a direction axially of the ring and integrally joining at their ends and with the land connectors with which associated.

6. In a piston ring of thin sheet metal, a plurality of successive spaced apart land segments located in pairs in two parallel planes spaced from each other, two spaced yieldingly resistant connecting means independently connecting the land segments of each pair, and substantially rigid ties between adjacent connecting means of successive land segments, whereby upon circumferential contraction of the ring reducing its diameter, the connecting means for each of the pairs of land segments are flexed.

7. In a piston ring of thin sheet metal, a plurality of successive spaced land segments located in opposed pairs in two parallel planes spaced from each other, yieldingly resistant connecting means between the lands of each pair extending from one land of each pair to the opposite land thereof and adapted to be flexed in the direction of the curvature of the ring, and substantially rigid connecting means between said land connecting means located between the planes of said lands and connecting the land connecting means of successive lands together, whereby upon compressive contraction of the ring in circumference, the land connecting means yield and the ends of the successive lands located in the same planes are brought closer to each other.

HOLLY M. OLSON.

REFERENCES CITED

The following references are of record in the file of this patent:

UNITED STATES PATENTS

| Number | Name | Date |
| --- | --- | --- |
| 2,235,297 | Norton et al. | Mar. 18, 1941 |
| 2,311,730 | Bowers | Feb. 23, 1943 |
| 2,346,896 | Bowers | Apr. 18, 1944 |
| 2,421,175 | Zahodiakin | May 27, 1947 |
| 2,432,602 | Zahodiakin | Dec. 16, 1947 |
| 2,482,990 | Olson | Sept. 27, 1949 |